(12) United States Patent
Okamura et al.

(10) Patent No.: US 7,449,101 B2
(45) Date of Patent: Nov. 11, 2008

(54) METHOD OF REDUCING CORROSION OF METAL MATERIAL

(75) Inventors: Masato Okamura, Yokohama (JP); Yukio Henmi, Yokohama (JP); Nagayoshi Ichikawa, Kawasaki (JP); Tetsuo Oosato, Tokyo (JP); Seiji Yamamoto, Tokyo (JP); Kazuo Murakami, Kawasaki (JP); Kenji Yamazaki, Yokohama (JP); Junichi Takagi, Yokohama (JP); Tadasu Yotsuyanagi, Yokohama (JP); Shunichi Suzuki, Yokohama (JP); Kenro Takamori, Yokohama (JP); Mitsuru Sambongi, Yokohama (JP); Yuichi Fukaya, Tokyo (JP); Takasi Hirano, Yokohama (JP)

(73) Assignees: Kabushiki Kaisha Toshiba, Tokyo (JP); The Tokyo Electric Power Company, Incorporated, Tokyo (JP); Ishikawajima - Harima Heavy Industries Co., Ltd., Tokyo (JP)

( * ) Notice: Subject to any disclaimer, the term of this patent is extended or adjusted under 35 U.S.C. 154(b) by 193 days.

(21) Appl. No.: 10/358,343

(22) Filed: Feb. 5, 2003

(65) Prior Publication Data
US 2003/0180180 A1 Sep. 25, 2003

(30) Foreign Application Priority Data
Feb. 6, 2002 (JP) ............................. P2002-029196

(51) Int. Cl.
*C23F 13/06* (2006.01)

(52) U.S. Cl. .................. 205/740; 205/736; 422/11; 422/14; 422/19; 376/305; 376/306; 376/414

(58) Field of Classification Search ................. 376/305, 376/306, 414; 422/11, 14, 19; 205/740, 205/736
See application file for complete search history.

(56) References Cited

U.S. PATENT DOCUMENTS

| 4,216,071 | A | * | 8/1980 | Gobrecht .................... 204/242 |
| 5,774,516 | A | * | 6/1998 | Hettiarachchi et al. ...... 376/305 |
| 6,898,259 | B2 | * | 5/2005 | Stellwag et al. ............. 376/305 |
| 6,940,939 | B1 | * | 9/2005 | Ichikawa et al. ............ 376/305 |
| 2002/0057755 | A1 | * | 5/2002 | Hemmi et al. .............. 376/313 |

FOREIGN PATENT DOCUMENTS

| DE | 197 21 080 | 10/1998 |
| DE | 100 30 726 | 4/2001 |
| EP | 0 671 485 | 9/1995 |
| JP | 2001-004789 | 1/2001 |

OTHER PUBLICATIONS

N. Ichikawa, et al., Water Chemistry of Nuclear Reactor Systems 8, pp. 407-411, "Evaluation Of Structural Material Protection From IGSCC by the Photoelectric Method in BWR". Oct. 22-26, 2000.

* cited by examiner

*Primary Examiner*—Bruce F Bell
(74) *Attorney, Agent, or Firm*—Oblon, Spivak, McClelland, Maier & Neustadt, P.C.

(57) ABSTRACT

In a method of reducing corrosion of a metal material, a substance such as semiconductor for generating an electric current by thermal excitation is coated or adhered on a metal material surface, to be exposed to a water having a high temperature of 150° C. or more, of a boiler and ducts or pipes, to which hot water heated by the boiler contacts, of a thermal electric power plant or a nuclear reactor structural material or ducts or pipes surrounding the reactor in a nuclear power plant.

7 Claims, 5 Drawing Sheets

METHOD OF REDUCING CORROSION OF METAL MATERIAL

BACKGROUND OF THE INVENTION

1. Field of the Invention

The present invention relates to a method of reducing corrosion of a metal material for restraining corrosion of a material to be exposed to high temperature water, for example, constituting structural members or elements of a nuclear power plant or a thermal electric power plant.

2. Description of the Related Art

As a metal material structure to be exposed to high temperature water, a boiler of a thermal electric power plant, a pipe or duct to be contacted with a hot water generated thereby will be presented. Moreover, in a case of a nuclear power plant, a nuclear reactor structural material and a peripheral pipe or duct thereof will be presented.

As a corrosion preventing measure for the pipe or the structural material, or the like, a countermeasure according to water quality improvement to the high temperature water has actively been executed. For example, in the thermal electric power plant, there has been provided a corrosion reducing counter measure to control the water quality by adding a pH adjuster, a deoxidant or the like.

In contrast, in a boiling water reactor power plant (hereinafter abbreviated as the BWR power plant), oxygen, hydrogen peroxide or the like generated by radiolysis of the water in a radiation field exist in the nuclear reactor water. Furthermore, it is also known that a stainless steel and a nickel-based alloy as the nuclear reactor structural material generate stress corrosion cracking under the existence of the oxygen and the hydrogen peroxide in the high temperature environment as like in the nuclear reactor.

For the countermeasure, a hydrogen injecting technique for injecting a hydrogen from a feed water system to reduce the oxygen and the hydrogen peroxide has been executed in several nuclear power plants in various countries. The effect of reducing the oxygen and the hydrogen peroxide appears as reduction of the corrosion potential of the material.

Generation of the stress corrosion cracking and progress of the cracking depend on the corrosion potential. With a lower potential, generation of the cracking and progress of the cracking can be restrained. According to such background, the hydrogen injection is executed, however, a harmful influence is involved in that the dose rate of the turbine system rises.

This is because an element $N^{16}$ produced at a nuclear reaction reacts with the hydrogen so as to provide a volatile ammonia which is easily moved to a steam turbine or like system. In addition, various kinds of equipment are required for injecting an oxygen for re-combining an excessive hydrogen in the off gas system generated by the injected hydrogen or the like.

In order to reduce a harmful influence to a minimum degree and lower the corrosion potential of the structural material, recently, there has been proposed a method of adding a noble metal to the nuclear reactor water and adhering the noble metal to the structural material to lower the corrosion potential by injecting the hydrogen by a small amount. This is a method of utilizing the nature of a noble metal such as a platinum of selectively scavenging reversible reaction of the hydrogen of a lower potential. By adhering the noble metal to the structural material, the corrosion potential can be lowered by injecting the hydrogen by a small amount.

However, according to the method of adhering the noble metal to the structural material described above, the hydrogen reaction is an important factor and addition of the hydrogen is inevitable, a large load is applied to the equipment. Thus, it is necessary to solve problems in terms of the equipment. Furthermore, in the case of executing the method of adding the noble metal to the nuclear reactor water in the actual plant, since the noble metal adheres also to the fuel assembly, in particular, to a zirconium oxide film of the fuel material such as fuel cladding tube or pipe, it becomes anxious to increase the oxidization and the hydrogenation of the fuel material.

Since an influence of the above fact will cause an adverse effect to improvement of fuel burnup, it is important to reduce the addition amount of the noble metal as well as reduce the use amount of the expensive noble metal or to develop a substance to be substituted for the noble metal.

SUMMARY OF THE INVENTION

The present invention has been achieved to substantially eliminate the defects or drawbacks encountered in the prior art mentioned above, and an object thereof is to provide a method of reducing corrosion of a metal material, which is capable of reducing corrosion of a structural metal material, for example, for a nuclear power plant or a thermal electric power plant derived from inter granular stress corrosion cracking (IGSCC) occurring in accordance with exposure to high temperature water or the like, capable of reducing the corrosion of the metal material without utilizing another equipment for injecting a hydrogen or the like, and furthermore, capable of controlling a corrosion potential of a nuclear reactor primary system material without large increase of movement of radioactivity to a turbine system or increase of oxygenation and hydrogenation of a fuel material.

The above and other objects can be achieved according to the present invention by providing a method of reducing corrosion of a metal material, wherein a substance for generating an electric current by thermal excitation is coated or adhered on a metal material surface to be exposed to a hot water.

In preferred examples, the metal material is a metal to be exposed to a water having high temperature of 150° C. or more.

The metal material is at least one kind selected from a group consisting of an iron ore, a non-iron ore material, a nonferrous metal and a welded metal. The electric current may be an anode electric current.

The substance for generating an electric current by the thermal excitation may be preferably a semiconductor. The semiconductor is an n-type semiconductor. The n-type semiconductor is at least one compound selected from a group consisting of a $TiO_2$, a PbO, a $BaTiO_3$, a $Bi_2O_3$, a ZnO, a $WO_3$, an $SrTiO_3$, an $Fe_2O_3$, an $FeTiO_3$, a $KTaO_3$, an $MnTiO_3$, an $SnO_2$, a $ZrO_2$, a $CeO_2$ and an $In_2O_3$. In this aspect, in a case that the n-type semiconductor is a $TiO_2$, an adhesion amount of adhering or coating the $TiO_2$ is 60 µg/cm² or more on a stainless steel surface, and it is 30 µg/cm² or more on a nickel-based alloy surface.

The corrosion potential may be −150 mV (SHE (Standard Hydrogen Electrode)) or lower in a case that the metal material is a stainless steel.

The corrosion potential may be 0 mV (SHE) or lower in a case that the metal material is a nickel-based alloy.

An adhesion amount of adhering or coating the substance for generating an electric current by the thermal excitation to the metal material, in a case that the substance is a $TiO_2$, is preferably of 20 µg/cm² or more on the metal surface when the metal material is a stainless steel and 10 μg/cm² or more on an alloy surface when the metal material is a nickel-based alloy.

In a more restricted aspect, there is provided a method of reducing corrosion of a metal material, wherein a substance for generating an electric current by thermal excitation is coated or adhered on a metal material surface, to be exposed to a water having a high temperature of 150° C. or more, of a boiler and ducts or pipes, to which hot water heated by the boiler contacts, of a thermal electric power plant or a nuclear reactor structural material or ducts or pipes surrounding the reactor in a nuclear power plant.

According to the present invention of the characters mentioned above, the corrosion of a metal material can be reduced by lowering the corrosion potential of the metal material to be exposed to high temperature water constituting, for example, of members or elements in the nuclear power plant or the thermal electric power plant by generating the exciting current in the high temperature water.

The nature and further characteristic features of the present invention will be made more clear from the following descriptions made with reference to the accompanying drawings.

DESCRIPTION OF THE PREFERRED EMBODIMENT

In the present invention, an exciting current is generated in high temperature water by utilizing the nature of a semiconductor to be excited by heat or light and thereby changing a surface potential of a metal material to be exposed to the high temperature water, for example, in a nuclear power plant or a thermal electric power plant (hereinafter may be referred to simply as "material"). The potential on the material surface is referred to as the corrosion potential, which is the guideline of the stress corrosion cracking sensitivity of the material. For example, many researches have been conducted for the corrosion potential of the stainless steel in the water of the high temperature of 288° C. It is said that the stress corrosion cracking is not generated in the case of −230 mV (SHE) or lower according to the results of a Slow Strain Rate Tension Test (hereinafter referred to as the SSRT). Moreover, it is suggested that the cracking growth rate is dramatically lowered by lowering the potential according to the result of the cracking growth test in the similar environment.

The corrosion potential of the material is determined by the reaction substance in the water in an environment to which the material is exposed, for example, in the case of the BWR power plant, by the electrochemical reaction on the material surface of the components such as oxygen, hydrogen peroxide and hydrogen produced in the radiolysis of the water and the elution reaction of the material itself.

The corrosion potential is determined on the basis of the mixed potential theory and is a potential equally having cathode current and anode current. Among the above-mentioned components, the oxygen and the hydrogen peroxide contribute to the cathode reaction, and the hydrogen and the material elution reaction contribute to the anode reaction.

The standard oxidization reduction potential of each electrochemical reaction is determined by a component concentration, a temperature, a pH of the environment, or the like, and the cathode reaction provides a potential higher than that of the anode reaction. Therefore, with the cathode reaction accelerated, the corrosion potential is made higher. This is same as that the corrosion potential is raised by the increase of the oxygen and hydrogen peroxide concentration. In contrast, the corrosion potential is lowered by the increase of the anode reaction.

Corrosion control by means of deoxidant and reduction of the oxygen and hydrogen peroxide concentration by hydrogen injection, which are conventionally executed, are methods for lowering the cathode reaction. In contrast, a potential lowering method by increasing the hydrogen reaction due to the noble metal adhesion is a corrosion reducing method by increasing the anode reaction.

The method according to the present invention is a method of increasing the anode reaction to change the corrosion potential. In order to increase the anode reaction, an n-type semiconductor is adhered or coated on the material surface. The semiconductor is excited by heat so that electrons are excited from a valence band to a conduction band so as to provide the electric current. Common semiconductor thermal excitation can be represented by the following formula:

$$n_i = N_0 \exp(-\epsilon g)/(2k_B T)$$

wherein, $n_i$ is concentration of electron-hole pair produced by thermal excitation, $n_0$ is constant concerning electron concentration at valence band, $\epsilon g$ is band gap, and $k_B$ is Boltzmann's constant.

Since the n-type semiconductor is used in the present invention, the excited electrons provide the anode electric current so as to lower the corrosion potential. As a representative n-type semiconductor used in this method, a $TiO_2$ can be presented. Since the $TiO_2$ has a band gap of 3 eV or 3.2 eV, for example, when the temperature is raised from a room temperature to 288° C., it is presumed that the number of the thermally excited electrons is made larger by the unit of digits.

Moreover, in the case of adopting the method according to the present invention to a nuclear reactor, the excitation reaction by a light is added. Since the $TiO_2$ is excited by the light with wavelength of 410 nm or less, the light can also be utilized in the case where a Cerenkov (Cherenkov) light is generated as like in the nuclear reactor core.

According to the present invention, the anode current is generated by adhering or coating the n-type semiconductor on the material surface so as to lower the corrosion potential. Since the reaction excited by heat is utilized, unlike the noble metal injection technique executed in, for example, the BWR power plant, it is not necessary to add the hydrogen.

Next, with reference to FIGS. 1 to 10, specific examples of the method of reducing corrosion of a metal material according to the present invention will be explained.

EXAMPLE 1

Figure 1:
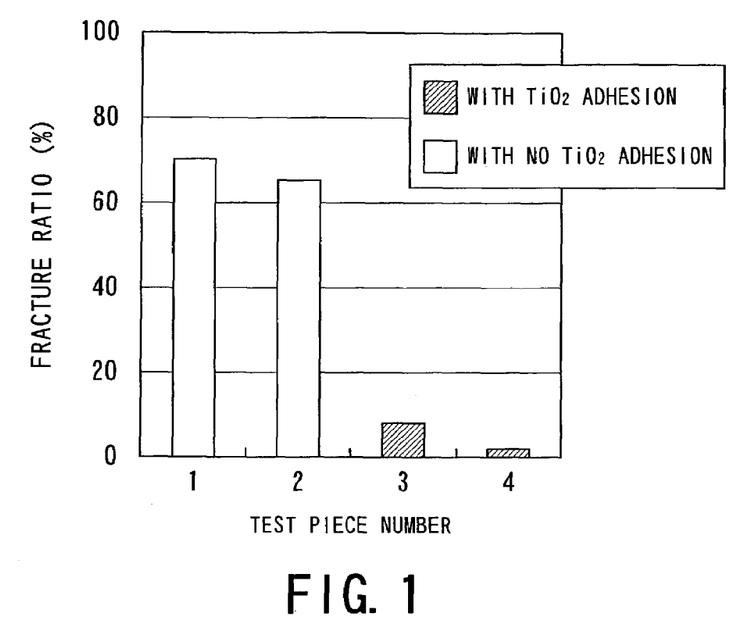
FIG. 1 is a bar graph showing comparison between Example 1 of a method of reducing corrosion of a metal material according to the present invention and a conventional example.

With reference to FIG. 1, Example 1 of the present invention will be explained.

FIG. 1 is a bar graph showing comparison of the fracture ratio using a sensitized SUS 304 steel as the metal material in the SSRT test result of the sensitized SUS 304 steel in a water having a high temperature of 280° C. between the case with a $TiO_2$ adhered on the SUS steel and the case without such adhesion. The value plotted in the vertical axis is the fracture ratio of the inter granular stress corrosion cracking (IGSCC) in the fracture after the test. A case with a higher fracture ratio denotes a high stress corrosion cracking sensitivity.

As to the water quality, the nuclear reactor water in an ordinary BWR power plant was simulated. As to the test piece, there were two kinds, that is, an SUS 304 steel with a $TiO_2$ coated by a spray method (a method of blowing a $TiO_2$ solution in a foggy state to the test piece for coating), and an SUS 304 steel without coating anything. As it is apparent from FIG. 1, the IGSCC fracture ratio is lowered significantly in the case where the $TiO_2$ is adhered to the SUS 304 steel.

EXAMPLE 2

Figure 2:
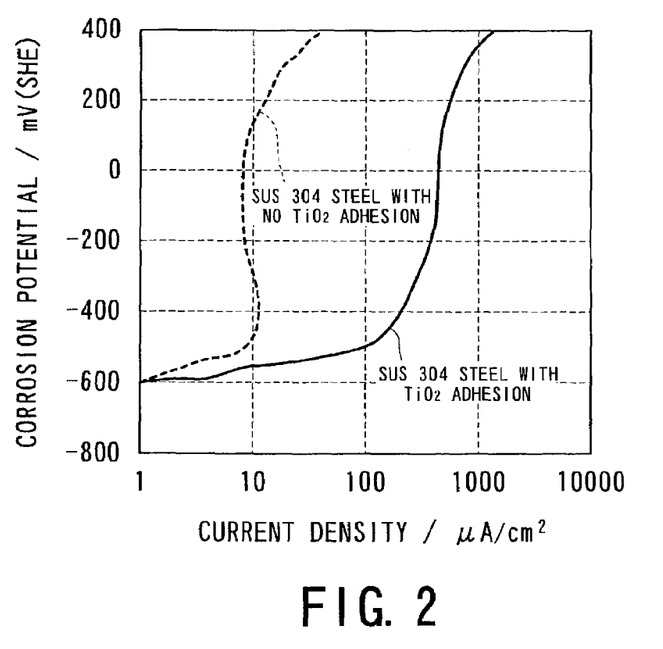
FIG. 2 is a curved graph showing comparison of anode polarization of SUS 304 steel test pieces between Example 2 of a method of reducing corrosion of a metal material according to the present invention and of a conventional example.
Figure 3:
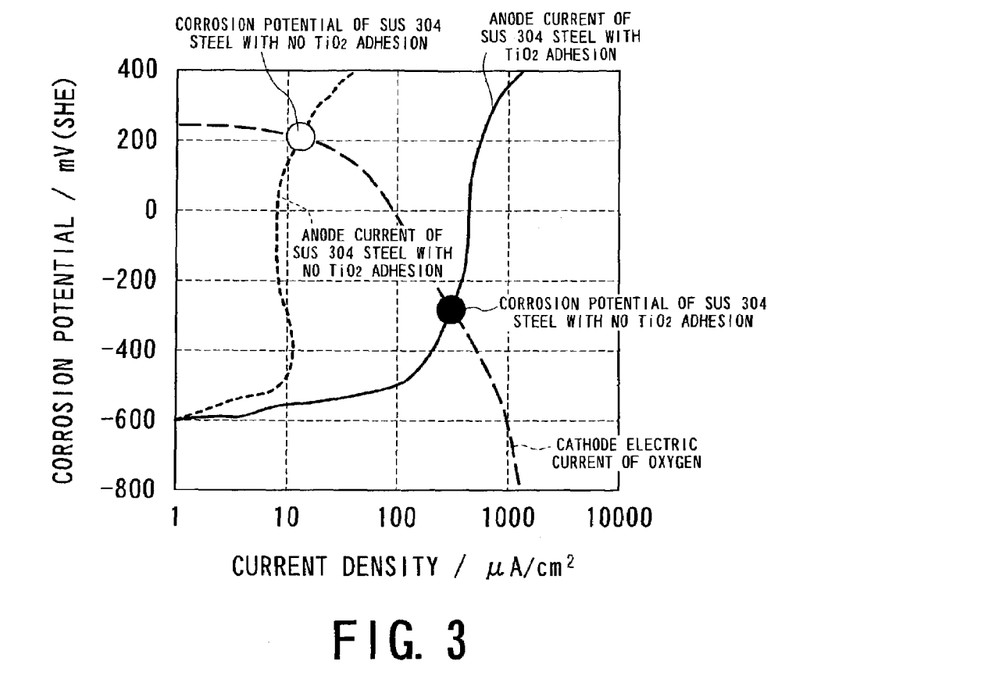
FIG. 3 is an Evans graph showing comparison of a change of a corrosion potential depending on the existence or absence of TiO$_2$ adhesion between the present invention and the conventional example as in FIG. 2.

With reference to FIGS. 2 and 3, Example 2 of the present invention will be explained.

Similar to Example 1, FIG. 2 shows comparison of the anode polarization curve of the test pieces of the sensitized SUS 304 steel between the case with the $TiO_2$ adhered and the case without such adhesion. FIG. 3 is an Evans graph showing the corrosion potential change depending on the existence or absence of the $TiO_2$ adhesion, with a cathode polarization curve of the oxygen also shown.

In Example 2, as it is apparent from the anode electric current curve of the SUS 304 steel in the 280° C. water shown in FIG. 2 between the case with the $TiO_2$ as the n-type semiconductor adhered and the case without such adhesion, it is observed that the anode electric current of the case with the $TiO_2$ adhered has a large electric current density.

Moreover, as it is apparent from the Evans graph showing the oxygen cathode polarization curve and the corrosion potential change shown in FIG. 3, the corrosion potential is the potential in the case of having the same value for the anode electric current and the cathode electric current so that the corrosion potential is lowered when the anode electric current is increased by the adhesion of the $TiO_2$.

EXAMPLE 3

Figure 4:
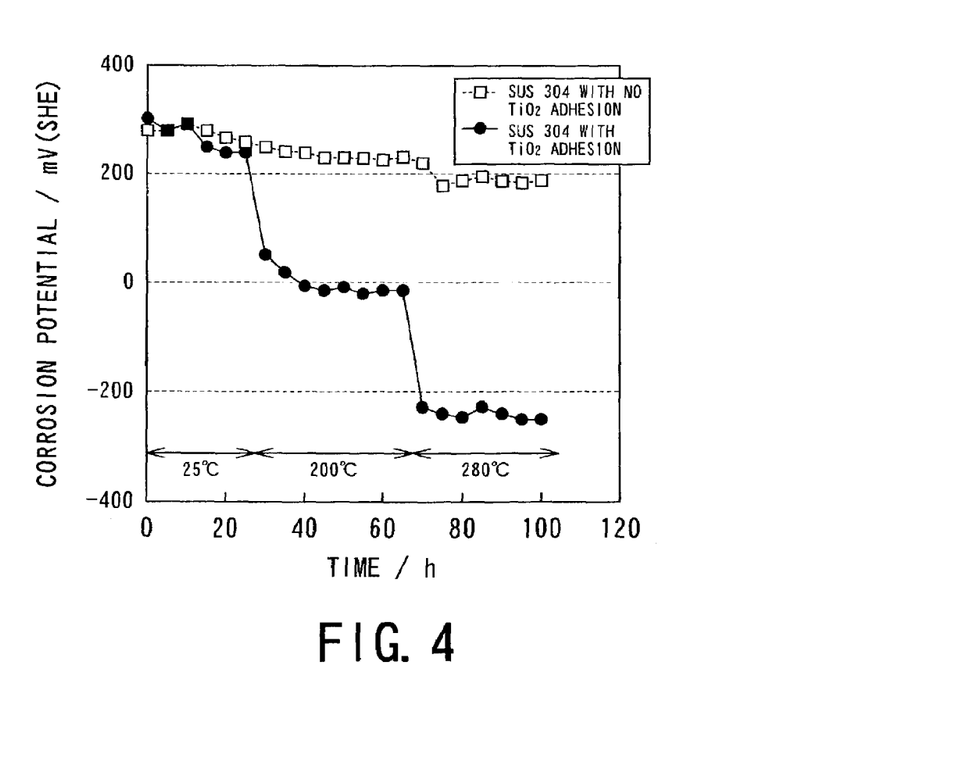
FIG. 4 is a plotted graph showing comparison of influence of a temperature change on a change of the corrosion potential of the SUS 304 steel with the TiO$_2$ adhesion for explaining Example 3 of the present invention.

With reference to FIG. 4, Example 3 of the present invention will be explained.

FIG. 4 shows the influence of the temperature change on the change of the corrosion potential of the case of the SUS 304 steel with the $TiO_2$ adhesion and the case without such adhesion. In Example 3, the $TiO_2$ adhesion amount was 200 $\mu g/cm^2$. The corrosion potential tends to be lowered with the temperature rise, and it was about −250 mV (SHE) at 280° C. In contrast, the corrosion potential of the SUS 304 without the $TiO_2$ adhesion shown in FIG. 4 has a small potential drop according to the temperature rise and it is observed that a potential shows +100 mV (SHE) or more even at 280° C.

EXAMPLE 4

Figure 5:
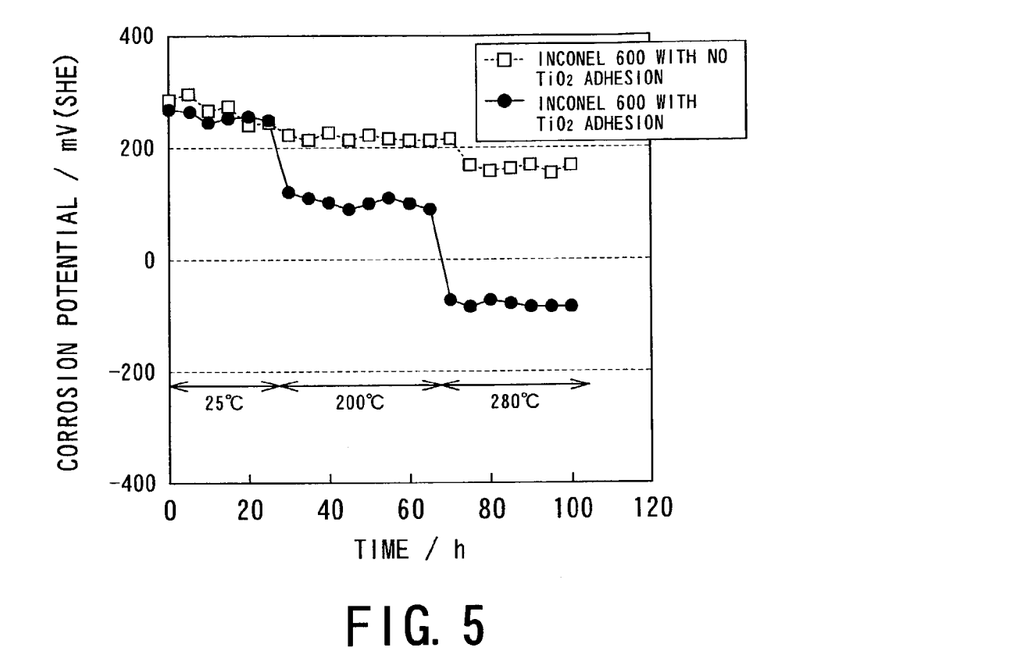
FIG. 5 is a plotted graph showing the influence of the temperature change on the change of the corrosion potential of an Inconel 600 alloy with the TiO$_2$ adhesion for explaining Example 4 of the present invention.

With reference to FIG. 5, Example 4 of the present invention will be explained.

This Example 4 is an example using, as the metal material, an Inconel as a nickel-based alloy used. FIG. 5 shows the influence of the temperature change on the change of the corrosion potential between the case where the $TiO_2$ is adhered to the Inconel 600 alloy and the case without such adhesion. In Example 4, the $TiO_2$ adhesion amount was 50 $\mu g/cm^2$. The corrosion potential tends to be lowered with the temperature rise in the case where the $TiO_2$ is adhered, and the corrosion potential was about −100 mV (SHE) at 280° C. In contrast, the corrosion potential of the Inconel 600 with no adhesion of $TiO_2$ shown in FIG. 5 has a small potential drop according to the temperature rise and it is observed that a potential shows +100 mV (SHE) or more even at 280° C.

EXAMPLE 5

Figure 6:
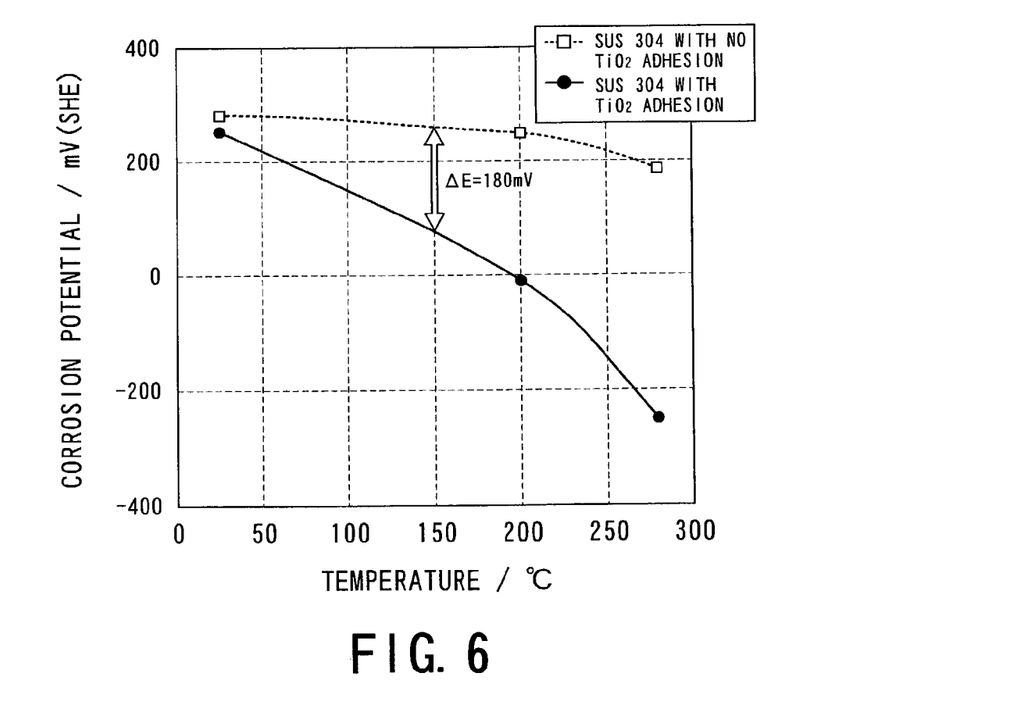
FIG. 6 is a curved graph showing the SUS 304 steel corrosion potential temperature dependency for explaining Example 5 of the present invention.
Figure 7:
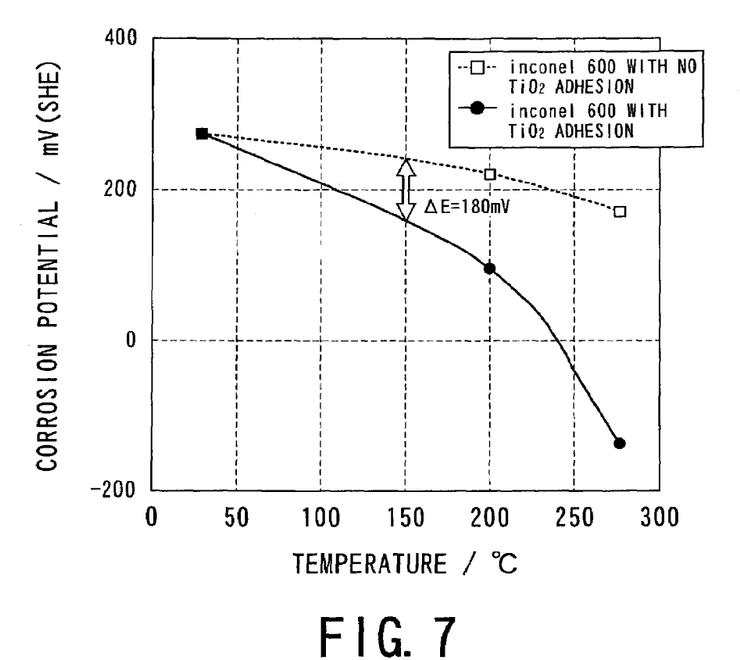
FIG. 7 is a curved graph showing the Inconel 600 alloy corrosion potential temperature dependency as in FIG. 6.

With reference to FIGS. 6 and 7, Example 5 of the present invention will be explained.

FIG. 6 shows comparison of the temperature dependency of the corrosion potential between the SUS 304 steel with the $TiO_2$ adhesion and that without such $TiO_2$ adhesion, and FIG. 7 shows comparison of the temperature dependency of the corrosion potential of a test piece of the Inconel 600 alloy with the same process applied.

As it is apparent form FIGS. 6 and 7, it is observed that the temperature dependency of the corrosion potential is lowered with a higher temperature. With each potential declining amount due to the $TiO_2$ adhesion at 150° C., the potential declines of Δ180 mV in the SUS 304 and of Δ80 mV in the Inconel 600 alloy is considered to occur, and this potential decline effect is considered to be in an effective range in terms of the corrosion reduction.

EXAMPLE 6

Figure 8:
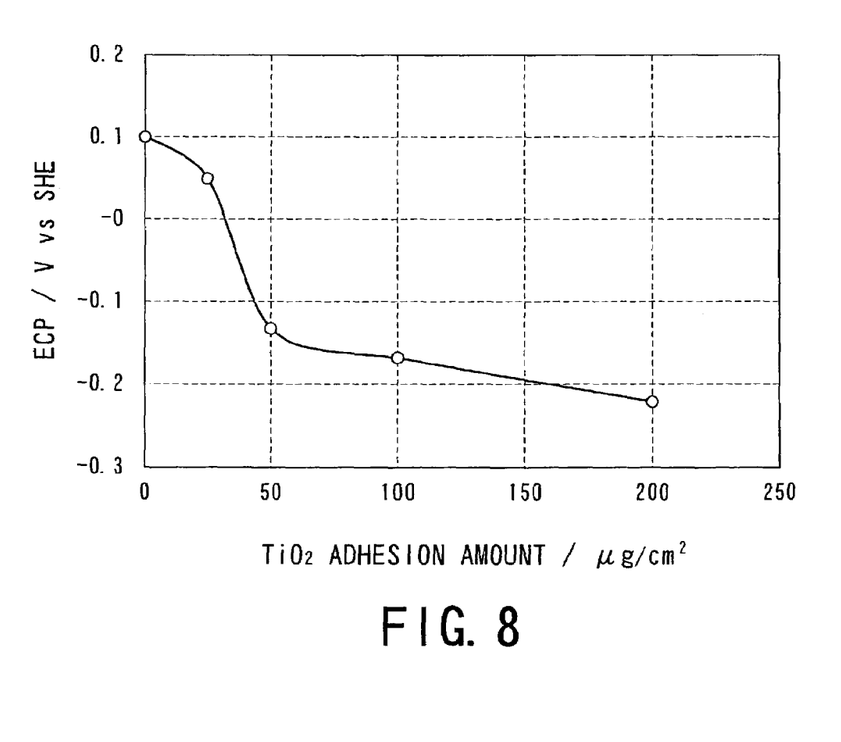
FIG. 8 is a curved graph showing a relationship between the corrosion potential without light irradiation of a stainless steel with TiO$_2$ adhered thereon in a water having a temperature of 280° C., and the TiO$_2$ adhesion amount for explaining Example 6 of the present invention.

With reference to FIG. 8, Example 6 will be explained.

FIG. 8 shows the relationship, with no light irradiation, between the corrosion potential of a stainless steel with the $TiO_2$ adhered thereon in a water having a temperature of 280° C. and the $TiO_2$ adhesion amount. As it is apparent from FIG. 8, the corrosion potential tends to be lowered according to increase of the $TiO_2$ adhesion amount. For example, in the case of an adhesion amount of about 25 $\mu m/cm^2$, the potential is 0 mV (SHE) or more but is lowered according to the increase of the adhesion amount so as to provide a potential of −200 mV (SHE) or less with the adhesion amount of 200 μg/cm$^2$.

A threshold potential value of the IGSCC occurrence of the stainless steel in a water having a 280° C. temperature is reported to be −230 mV (SHE) as mentioned above. For example, it is observed from FIG. 8 that the TiO$_2$ adhesion amount of 200 μg/cm$^2$ or more is needed for achieving the threshold value.

According to a preferred example of the present invention, in the case of the stainless steel, the corrosion potential as the guideline representing the corrosion degree is determined to −150 mV (SHE) based on the judgment that a sufficient effect can be provided in consideration of the corrosion reduction even if the threshold value of −230 mV (SHE) is not achieved.

Moreover, according to another example of the present invention, in the case of the nickel-based alloy, similarly, the threshold value is reported to be −50 mV (SHE) based on the fact that the range of observing the reduction effect was set at 0 mV (SHE) or less.

Furthermore, as to the TiO$_2$ adhesion amount of the present invention, this adhesion amount can be presumed between the potential of the minimum adhesion amount (25 μg/cm$^2$) and that with no TiO$_2$ adhesion (the corrosion potential is 100 mV) in FIG. 8 based on the fact that the adhesion amount of 60 μg/cm$^2$ to have the −150 mV (SHE) value in the case of the stainless steel and the adhesion amount of 30 μg/cm$^2$ to have the 0 mV (SHE) value in the case of the nickel-based alloy were found.

EXAMPLE 7

Figure 9:
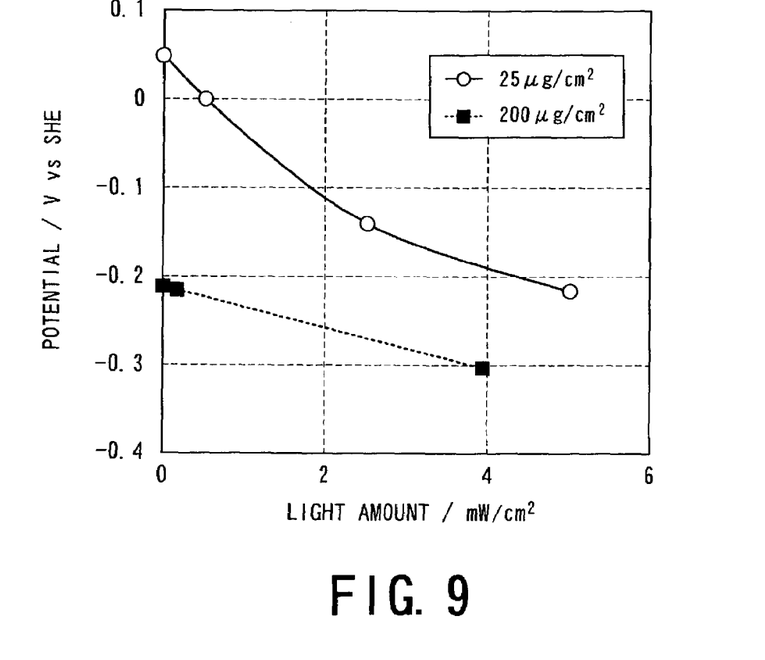
FIG. 9 is a curved graph showing a relationship between the corrosion potential of a stainless steel with TiO$_2$ adhered thereon in a water having a temperature of 280° C., and the light irradiation amount for explaining Example 7 of the present invention.

With reference to FIG. 9, Example 7 of the present invention will be explained.

FIG. 9 shows the relationship between the corrosion potential of a stainless steel with the TiO$_2$ adhesion in a water having high temperature of 280° C., and the light irradiation amount. The ○ mark denotes the adhesion amount of 25 μg/cm$^2$, and the ■ mark denotes the adhesion amount of 200 μg/cm$^2$. As it is apparent from FIG. 9, the corrosion potential decline by the light irradiation is observed. In the case of the adhesion amount of 25 μg/cm$^2$ with existence of the light, the same corrosion potential decline is also observed as in the case where the TiO$_2$ of 200 μm/cm$^2$ is adhered without existence of the light.

That is, when the Cerenkov light generated in the nuclear reactor core is directed to the structural material as in the nuclear reactor structural material, the effect of reducing the corrosion potential can be obtained even in the case of a small TiO$_2$ adhesion amount.

Although the embodiments with the TiO$_2$ adhesion amount of 25 μg/cm$^2$ and the light amount up to 5 mW/cm$^2$ have been described, it will easily be presumed that the corrosion potential is lowered even with a small TiO$_2$ adhesion amount with a higher light amount. Moreover, by using the relationship between the light amount and the TiO$_2$ adhesion amount influencing the corrosion potential shown in FIG. 9, the condition for achieving the target corrosion potential value can be presumed.

In a case when the light amount on the surface of the nuclear reactor structural material is known, to which degree the TiO$_2$ adhesion amount is to be set can be presumed. Moreover, it is apparent that the target corrosion potential can be controlled by the sufficient TiO$_2$ adhesion in the case of no existence of the light.

EXAMPLE 8

Figure 10:
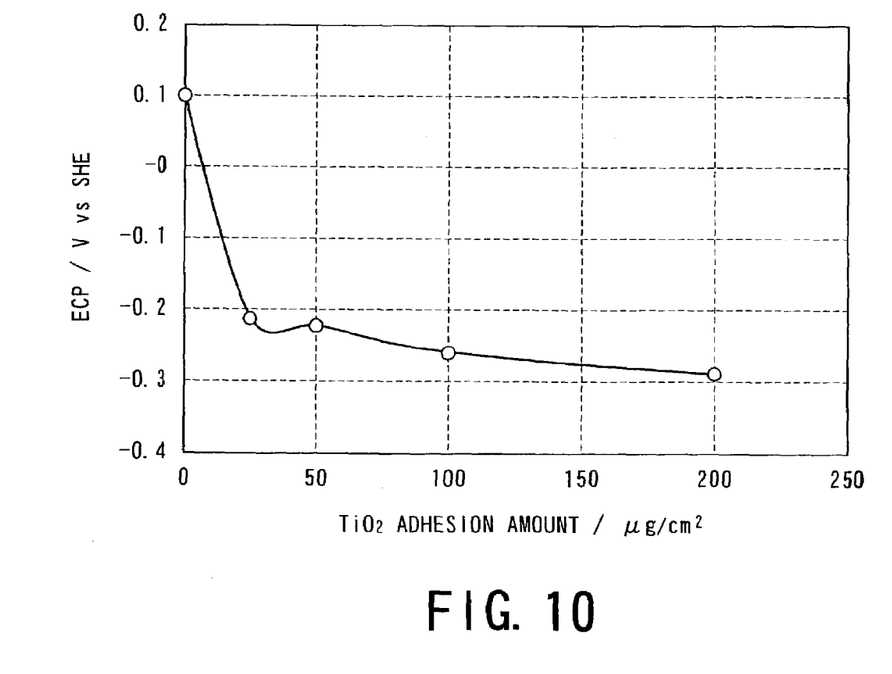
FIG. 10 is a curved graph showing a relationship between the corrosion potential under the light irradiation of a stainless steel with TiO$_2$ adhered thereon in a water having a temperature of 280° C., and the TiO$_2$ adhesion amount for explaining Example 8 of the present invention.

With reference to FIG. 10, Example 8 of the present invention will be explained.

FIG. 10 shows the relationship between the corrosion potential of a stainless steel with the TiO$_2$ adhesion under the light irradiation in a water having a high temperature of 280° C. and the TiO$_2$ adhesion amount. As it is apparent from FIG. 10, with the TiO$_2$ adhesion amount increase, the corrosion potential is lowered, but the drop is small compared with the condition of no light irradiation. It is also found that the potential drop effect can be obtained with a small TiO$_2$ adhesion amount under the light irradiation.

According to a further preferred example of the present invention, by using the corrosion potential at the TiO$_2$ adhesion amount of 25 μg/cm$^2$ shown in FIG. 10 and the corrosion potential of 100 mV (SHE) with no TiO$_2$ adhesion amount, the adhesion amount of 20 μg/cm$^2$ to have the −150 mV (SHE) value in the case of the stainless steel and the adhesion amount of 10 μg/cm$^2$ to have the 0 mV (SHE) value in the case of the nickel-based alloy were found.

Moreover, in the case of the nuclear reactor, since the electric current is generated according to the excitation by the radiation or the Cerenkov light, the adhesion amount of a substance generated by the electric current by the thermal excitation in the case of the TiO$_2$, is preferably 20 μg/cm$^2$ or more on the stainless steel surface, and it is preferably 10 μg/cm$^2$ or more on the nickel-based alloy surface.

The present invention can be adopted for the structural material, or the like in the environment to be exposed to high temperature water not only in the BWR power plant but also in the pressurized water type nuclear (PWR) power plant or the thermal electric power plant.

According to the present invention, corrosion of the metal material can be reduced by lowering the corrosion potential of the metal material to be exposed to high temperature water in the nuclear power plant or the thermal electric power plant by generating the exciting current in the high temperature water.

It is further to be noted that the present invention is not limited to the described embodiments and many other changes can be made without departing from the scopes of appended claims.

What is claimed is:

1. A method of reducing corrosion of a metal material on a metal material surface to be exposed to hot water in a power plant, comprising:

coating or adhering an n-type semiconductor substance having conductivity for generating an anode current by thermal excitation in the absence of irradiation of light on the metal material surface to be exposed to hot water in a power plant, and exposing the metal surface to water having a temperature of 150° C. or more, wherein the n-type semiconductor is at least one compound selected from a group consisting of a TiO$_2$, a PbO, a BaTiO$_3$, a Bi$_2$O$_3$, a ZnO, a WO$_3$, an SrTiO$_3$, an Fe$_2$O$_3$, an FeTiO$_3$, a KTaO$_3$, an MnTiO$_3$, an SnO$_2$, a ZrO$_2$, a CeO$_2$ and an In$_2$O$_3$.

2. The method of reducing corrosion of a metal material on a metal material surface to be exposed to hot water in a power plant according to claim 1, wherein the metal material is at least one kind selected from a group consisting of an iron ore, a non-iron ore material, a nonferrous metal and a welded metal.

3. The method of reducing corrosion of a metal material on a metal material surface to be exposed to hot water in a power plant according to claim 1, wherein, in a case that the n-type semiconductor is a $TiO_2$, an adhesion amount of adhering or coating the $TiO_2$ is 60 μg/cm$_2$ or more on a stainless steel surface, and 30 μg/cm$_2$ or more on a nickel-based alloy surface.

4. The method of reducing corrosion of a metal material on a metal material surface to be exposed to hot water in a power plant according to claim 1, wherein a corrosion potential of the coated metal material is −150 mV (SHE) or lower in a case that the metal material is a stainless steel.

5. The method of reducing corrosion of a metal material on a metal material surface to be exposed to hot water in a power plant according to claim 1, wherein a corrosion potential of the coated metal material is 0 mV (SHE) or lower in a case that the metal material is a nickel-based alloy.

6. The method of reducing corrosion of a metal material on a metal material surface to be exposed to hot water in a power plant according to claim 1, wherein an adhesion amount of adhering or coating the substance for generating an electric current by the thermal excitation to the metal material, in a case that the substance is a $TiO_2$, is 20 μg/cm$_2$ or more on the metal surface when the metal material is a stainless steel and 10 μg/cm$_2$ or more on an alloy surface when the metal material is a nickel-based alloy.

7. A method of reducing corrosion of a metal material on a metal material surface to be exposed to hot water in a power plant, comprising coating or adhering the metal material surface with an n-type semiconductor substance having conductivity for generating an anode current by thermal excitation in the absence of irradiation of light, exposing the metal material surface to water having a temperature of 150° C. or more, wherein the metal material surface is a surface of a boiler and ducts or pipes, which hot water heated by the boiler contacts, of a thermal electric power plant or a nuclear reactor structural material or ducts or pipes surrounding the reactor in a nuclear power plant, the n-type semiconductor is at least one compound selected from a group consisting of a $TiO_2$, a $PbO$, a $BaTiO_3$, a $Bi_2O_3$, a $ZnO$, a $WO_3$, an $SrTiO_3$, an $Fe_2O_3$, an $FeTiO_3$, a $KTaO_3$, an $MnTiO_3$, an $SnO_2$, a $ZrO_2$, a $CeO_2$, and an $In_2O_3$.

* * * * *